(12) United States Patent
Reese et al.

(10) Patent No.: US 7,382,501 B2
(45) Date of Patent: Jun. 3, 2008

(54) REMOTE ACCESS OF FAX NUMBERS FOR FAX TRANSMISSION

(75) Inventors: Curtis Reese, Boise, ID (US); Brett Green, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1055 days.

(21) Appl. No.: 10/613,407

(22) Filed: Jul. 3, 2003

(65) Prior Publication Data
US 2005/0002066 A1    Jan. 6, 2005

(51) Int. Cl.
*H04N 1/04* (2006.01)
*H04N 1/024* (2006.01)
*H04N 1/00* (2006.01)

(52) U.S. Cl. ............... 358/474; 358/473; 358/478; 358/434

(58) Field of Classification Search ........... 358/474, 358/473, 478, 434, 404
See application file for complete search history.

(56) References Cited

U.S. PATENT DOCUMENTS

| | | | |
|---|---|---|---|
| 6,108,411 A | 8/2000 | Otsuka et al. | |
| 6,246,489 B1 | 6/2001 | Park | |
| 6,320,943 B1 | 11/2001 | Borland | |
| 6,487,180 B1 | 11/2002 | Borgstahl et al. | |
| 6,532,366 B1 | 3/2003 | Chung et al. | |
| 2003/0048484 A1* | 3/2003 | Seki et al. | 358/402 |
| 2003/0203744 A1* | 10/2003 | Otsuka | 455/551 |
| 2005/0144562 A1* | 6/2005 | Schena et al. | 715/741 |

FOREIGN PATENT DOCUMENTS

| | | |
|---|---|---|
| JP | 08126054 | 5/1996 |
| JP | 2002101185 | 4/2002 |
| JP | 2003087455 | 3/2003 |

OTHER PUBLICATIONS

Thermotransfer-Faxgerat KX-FC195, Mar. 2003.
Panasonic Handbook for Model KX-FC195G.

* cited by examiner

*Primary Examiner*—Houshang Safaipour

(57) ABSTRACT

A fax is sent. A user selects a phone number for a fax destination from a database residing on a handheld device. The phone number is sent from the handheld device to a fax machine via wireless communication. A fax transmission is sent by the fax machine to the fax destination.

28 Claims, 4 Drawing Sheets

REMOTE ACCESS OF FAX NUMBERS FOR FAX TRANSMISSION

BACKGROUND

In facsimile (fax) transmissions, data is encoded for transmission over telephone lines or radio broadcast for print out at a remote location.

When performing a fax transmission, after making a connection with a receiving fax machine, a transmitting fax machine scans an image including, for example, text and/or graphics, by reading a very small area of the image at a time. The fax machine decides whether the area read is light or dark and digitizes the area by assigning the area a number such as "0" for white and "1" for dark. Then the fax transmits the number to a remote facsimile receiver. The receiver, for example, prints out the received image on a print media. This process continues as the transmitting machine scans a series of small areas horizontally across the image, and transmits that information to the remote receiver. The transmitting fax then scans a next lower line and so on until the entire image has been scanned, digitized, and transmitted.

As fax machines have increased in popularity, features have been added to fax machines to make them more versatile and convenient. For example, some fax machines have the ability to scan and transmit color images. Some fax machines include auto-dialing and fax number storage. There is a continuing quest to improve fax machines by increasing their versatility and convenience of use.

SUMMARY OF THE INVENTION

In accordance with the preferred embodiment of the present invention, a fax is sent. A user selects a phone number for a fax destination from a database residing on a handheld device. The phone number is sent from the handheld device to a fax machine via wireless communication. A fax transmission is sent by the fax machine to the fax destination.

DESCRIPTION OF THE PREFERRED EMBODIMENT

Figure 1:
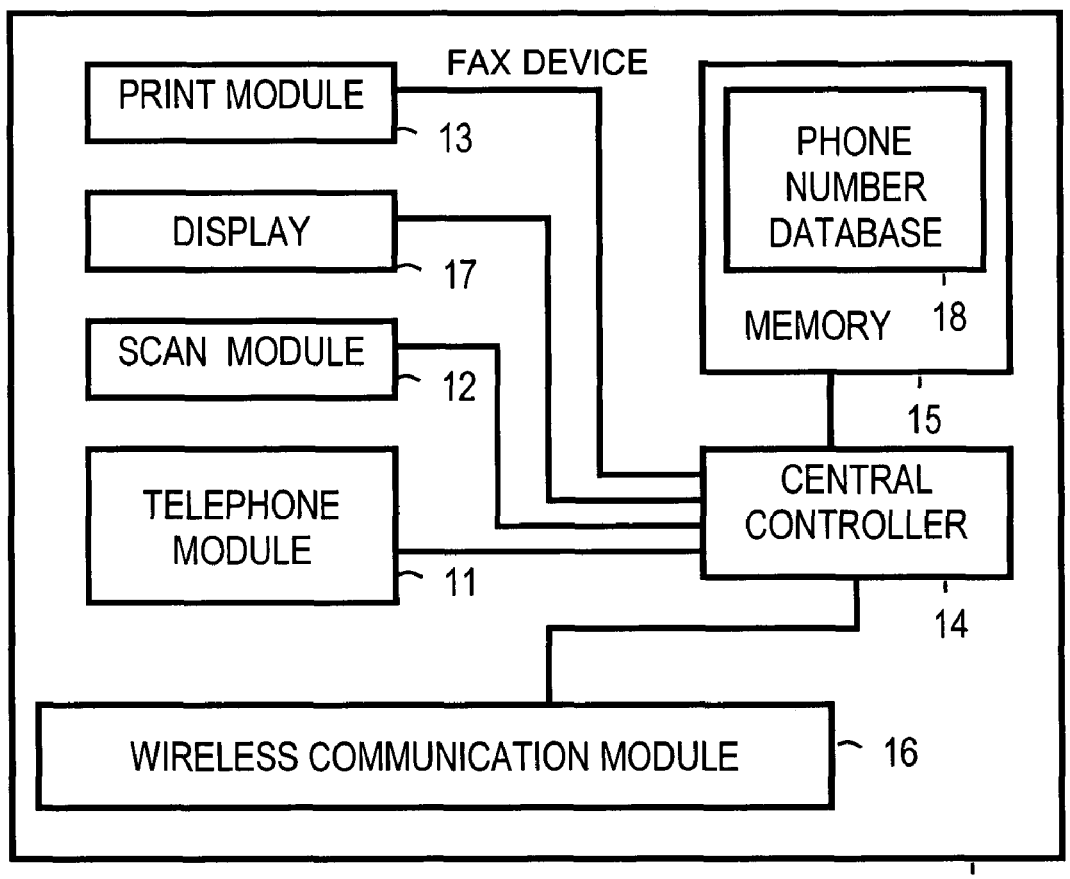
FIG. 1 is simplified block diagram of a fax machine in wireless communication with a handheld unit in accordance with a preferred embodiment of the present invention.
Figure 1:
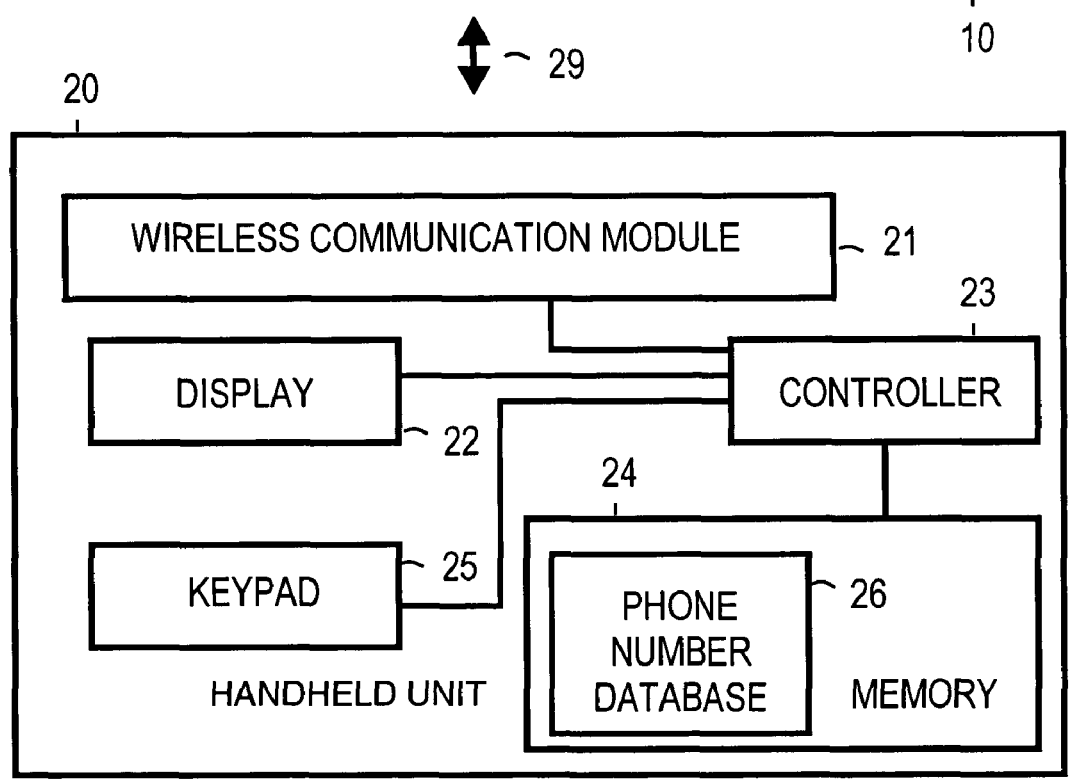

FIG. 1 is a simplified illustration of a fax machine 10 in wireless communication with a handheld unit 20. Fax machine 10 is shown to include a print module 13, a display 17, a scan module 12, a telephone module 11, a central controller 14, a memory 15 and a wireless communication module 16. For example, memory 15 is used to store a phone number database 18. For example, controller 14 includes a computer processor that executes programming code stored in memory 15. Wireless communication module 16 facilitates wireless communication using, for example, radio frequency signals or infrared signals using one or more standard or proprietary protocols such as IEEE 802.11b wireless, BlueTooth wireless technology and/or another of the many available or to be developed wireless protocols. The block diagram of fax machine 10 is meant to be illustrative only. That is, a person of ordinary skill in the art would recognize that fax machine 10 can be implemented with more or fewer modules arranged in a variety of configurations. The number and types of features in fax machines differs widely and have a strong effect on the way any particular fax machine is implemented.

Fax machine 10 is shown to be in wireless communication with a handheld unit 20, as illustrated by arrows 29. A handheld unit is a unit that is designed to be used while being held in one hand. Handheld unit 20 is, for example, a cell phone or a personal digital assistant (PDA). For example, a desktop computer and a laptop computer are not designed to be used while being held in one hand and so are not handheld devices as the term is used herein.

Handheld unit 20 is shown to include a display 22, a keypad 25, a memory 24, a controller 23 and a wireless communication module 21. For example, memory 24 is used to store a phone number database 26. For example, keypad 25 includes keys located separate from display 22 on handheld unit 20. Alternatively, keypad 25 is integrated with display 22 in a touchpad configuration. For example, wireless communication module 21 facilitates wireless communication using, for example, radio frequency signals or infrared signals using one or more standard or proprietary protocols. For example, controller 23 includes a computer processor that executes program code stored in memory 24. The block diagram of handheld unit 20 is meant to be illustrative only. That is, a person of ordinary skill in the art would recognize that handheld unit 20 can be implemented with more or fewer modules arranged in a variety of configurations depending upon the function and features of handheld unit 20.

Figure 2:
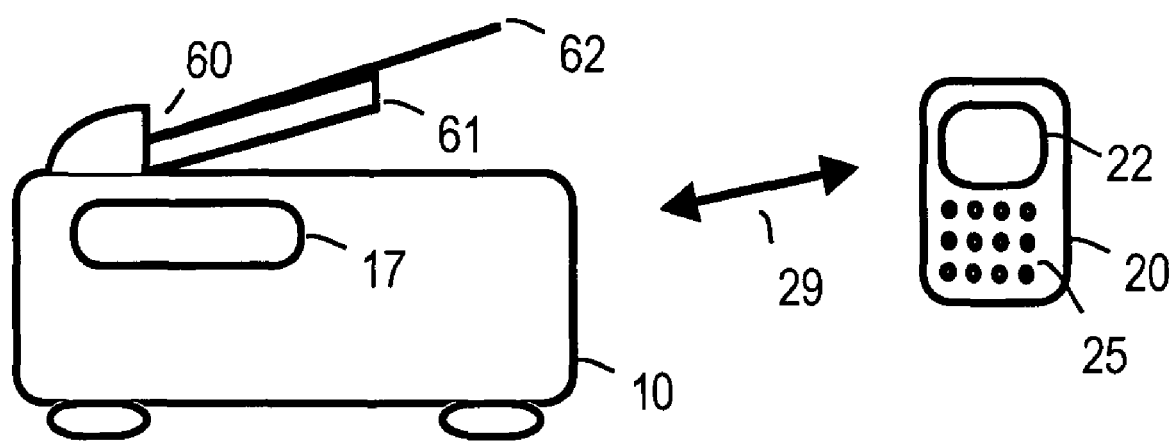
FIG. 2 is an illustration of the fax machine and the handheld unit shown in FIG. 1 in accordance with a preferred embodiment of the present invention.

FIG. 2 is a simplified illustration of fax machine 10 and handheld unit 20 in wireless communication, as illustrated by arrows 29. An embodiment of display 17, display 22 and keyboard 25 are shown. Also shown are a fax input tray 61 and a document 62 loaded into a fax input 60 via fax input tray 61.

Figure 3:
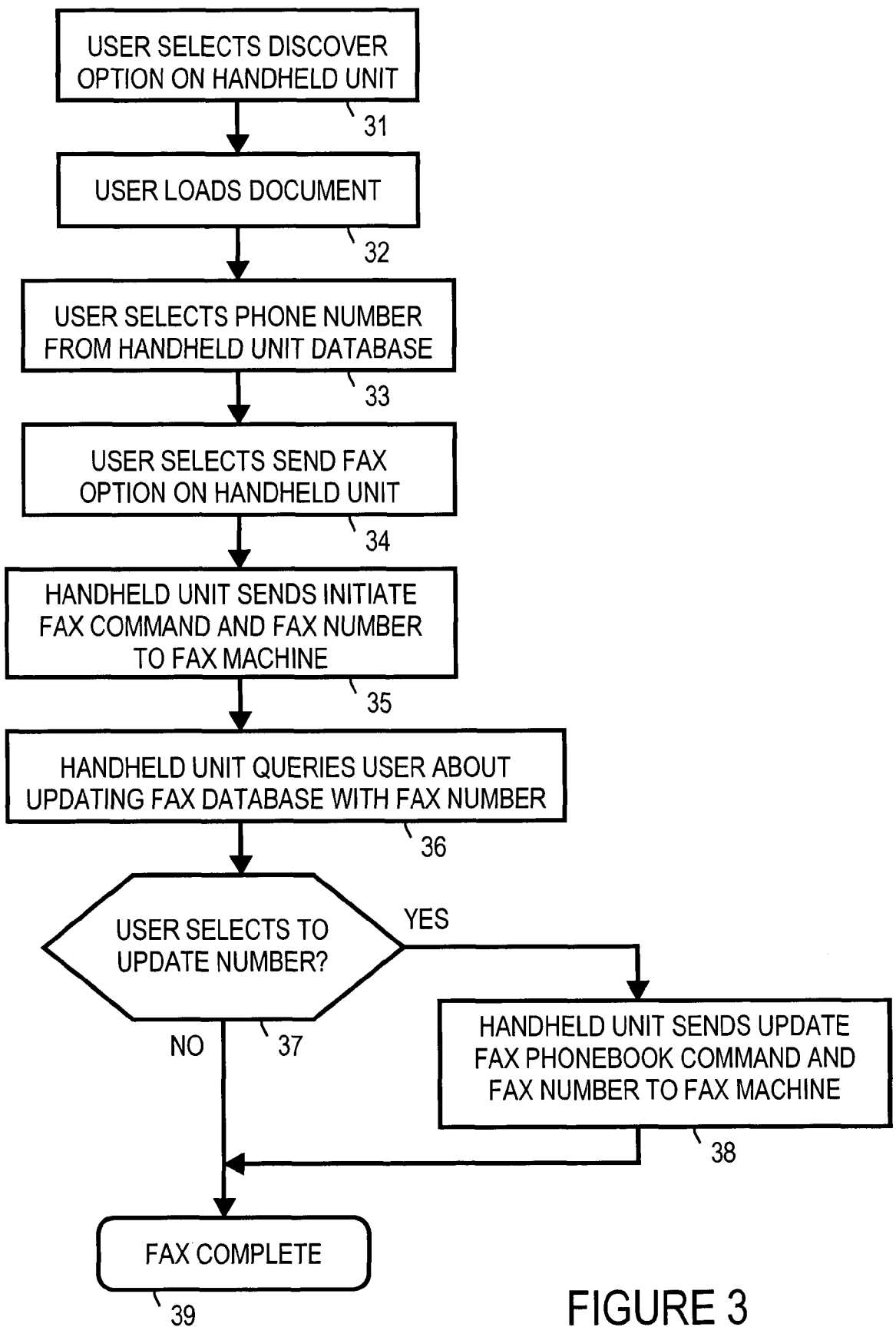
FIG. 3 is a flowchart illustrating handheld access of a fax number initiated by a user using a handheld unit in accordance with a preferred embodiment of the present invention.

FIG. 3 is a flowchart illustrating initiation of a fax by a user using handheld unit 20. In a block 31, a user uses keypad 25 and/or display 22 to select a discover function. In response to selection of the discover function, handheld unit 20 uses wireless communication module 21 to locate and establish contact with any nearby fax machine. When handheld unit 20 discovers and establishes communication with fax machine 10, handheld unit 20 signals the user (e.g., through display 22, an audible sound, and/or a flashing light, etc.) that a fax machine has been detected.

In a block 32, the user loads the document to be faxed into fax input 60. In a block 33, the user selects from phone number database 26 one or more fax numbers for the fax destination. In a block 34, the user uses keypad 25 and/or display 22 to select a send fax option. In a block 35, handheld unit 20 uses wireless communication module 21 to send to fax machine 10 an initiate fax command. The initiate command is accompanied by the one or more fax numbers the user selected from phone number database 26. If specified by the user, the initiate command can also include a name, address and/or other personal information associated with the fax number for inclusion in a fax cover sheet automatically generated by fax machine 20. Fax machine 20 then initiates sending a fax to the one or more fax numbers the user selected from phone number database 26 along with any other personal information received.

In a block 36, handheld unit 20 uses display 22 to query the user about updating phone number database 18 in memory 15 of fax machine 10 with the one or more fax numbers. In a block 37, handheld unit 20 processes the response from the user. If the user requests an update of phone number database 18 in memory 15 of fax machine 10, in block 38, handheld unit 20 uses wireless communication module 21 to send to fax machine 10 an update fax phone book command. The update fax phone book command is accompanied by the one or more fax numbers the user selected from phone number database 26. The update fax phone book command also is accompanied by a name, address and/or other personal information associated with the fax number for inclusion in phone number database 18 in memory 15 of fax machine 10. In a block, 39 the fax is complete.

Figure 4:
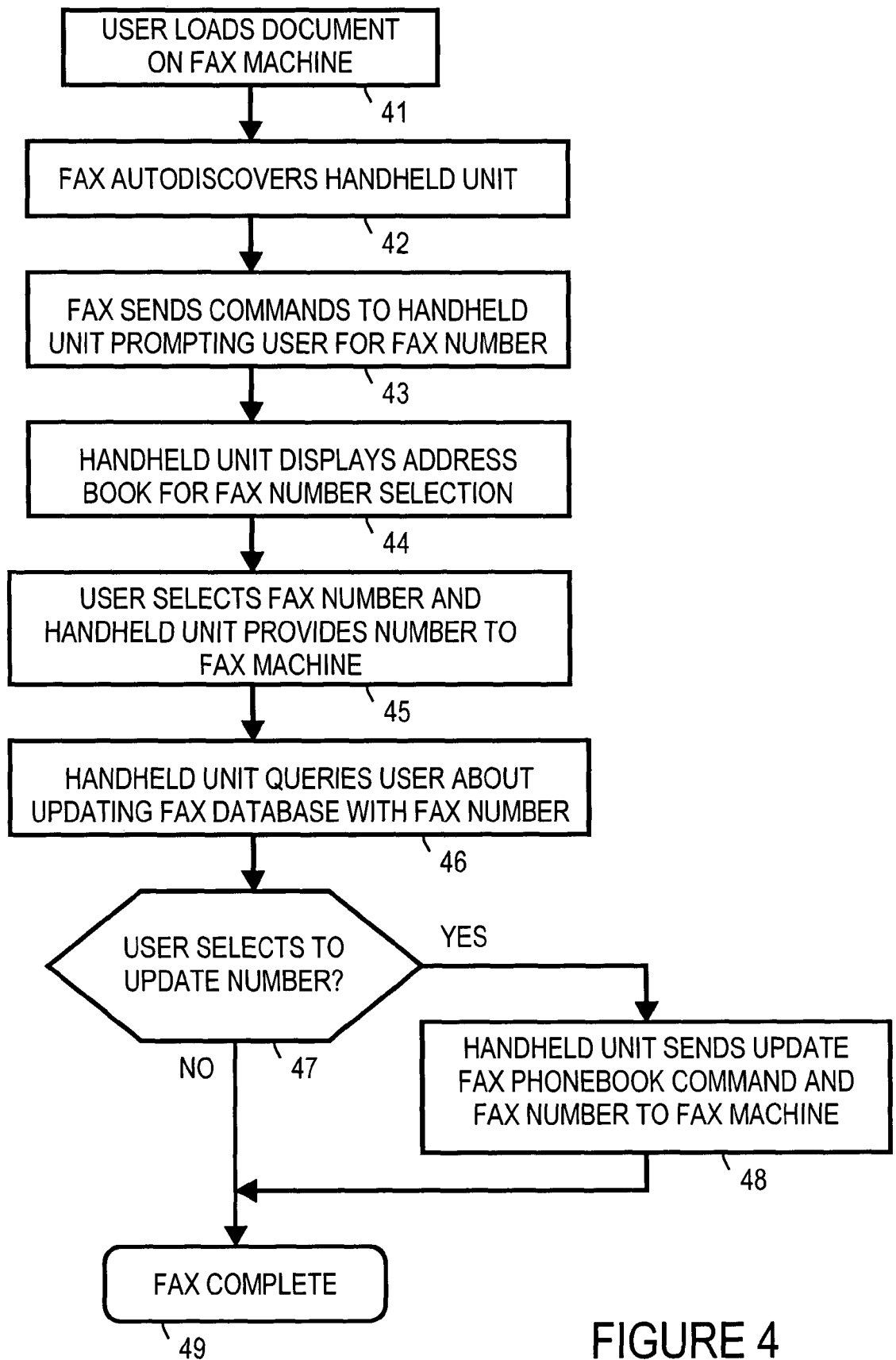
FIG. 4 is a flowchart illustrating handheld access of a fax number initiated by a user using a fax machine in accordance with another preferred embodiment of the present invention.

FIG. 4 is a flowchart illustrating handheld access of a fax number initiated by a user using fax machine 10. In a block 41, the user loads the document to be faxed into the fax input.

In a block 42, fax machine 10 uses wireless communication module 16 to locate and establish contact with any nearby handheld device. When fax machine 10 discovers handheld device 20, fax machine 10 establishes communication with handheld unit 20.

In a block 43, fax machine 10 uses wireless communication module 16 to send to handheld unit 20 a prompt command instructing handheld unit 20 to prompt the user for one or more phone numbers for the destination of a fax.

In a block 44, handheld unit 20 opens phone number database 26 and uses display 22 to display at least a portion of open phone number database 26 to the user.

In a block 45, the user selects from phone number database 26 one or more fax numbers for the fax destination. The user uses keypad 25 and/or display 22 to indicate the one or more fax numbers for the fax destination(s) that are to be provided to fax machine 10. Handheld unit 20 uses wireless communication module 21 to send to fax machine 10 the one or more fax numbers the user selected from phone number database 26. If specified by the user, the initiate command can also include a name, address and/or other personal information associated with the fax number for inclusion in a fax cover sheet automatically generated by fax machine 20. Fax machine 20 then initiates sending a fax to the one or more fax numbers the user selected from phone number database 26 along any other personal information received.

In a block 46, handheld unit 20 uses display 22 to query the user about updating phone number database 18 in memory 15 of fax machine 10 with the one or more fax numbers. In a block 47, handheld unit 20 processes the response from the user. If the user requests an update of phone number database 18 in memory 15 of fax machine 10, in block 48, handheld unit 20 uses wireless communication module 21 to send to fax machine 10 an update fax phone book command. The update fax phone book command is accompanied by the one or more fax numbers the user selected from phone number database 26. The update fax phone book command also is accompanied by a name, address and/or other personal information associated with the fax number for inclusion in phone number database 18 in memory 15 of fax machine 10. In a block 49, the fax is complete.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure is intended to be illustrative, but not limiting, of the scope of the invention, which is set forth in the following claims.

We claim:

1. A method for sending a facsimile (fax) comprising the following:
    selecting, by a user, a phone number for a fax destination from a database residing on a handheld device;
    sending the phone number from the handheld device to a fax machine via wireless communication;
    sending a fax transmission by the fax machine to the fax destination; and
    querying the user, by the handheld device, whether to update a fax number database residing on the fax machine with the phone number for the fax destination from the database residing on the handheld device, including the following:
    sending a command from the handheld device to the fax machine instructing the fax machine to update the fax number database residing on the fax machine with the phone number for the fax destination.

2. A method as in claim 1, wherein before selecting the phone number, the method includes the following:
    loading, by the user, a document into the fax machine;
    establishing communication between the fax machine and the handheld device; and,
    sending a command, by the fax machine to the handheld device, requesting the handheld device to prompt the user for a fax number.

3. A method as in claim 1, wherein the phone number and additional information associated with the phone number are included with the command.

4. A method as in claim 1 wherein sending the phone number from the handheld device to the fax machine includes the following:
    sending along with the phone number additional information stored in the database residing on the handheld device, the additional information being associated with the phone number.

5. A method as in claim 1 wherein selecting, by the user, the phone number for the fax destination includes selecting, by the user, at least one more additional phone number for at least one additional fax destination.

6. A method as in claim 1, wherein before selecting the phone number, the method includes the following:
    selecting, by the user, a discover option on the handheld device; and
    loading, by the user, a document into the fax machine.

7. A method as in claim 1 wherein sending the phone number from the handheld device to the fax machine includes the following:
    sending an initiate fax command along with the phone number.

8. A method as in claim 1 wherein the handheld device is one of the following:
    a cell phone;
    a personal digital assistant.

9. A fax machine comprising:
    a document input;
    a wireless communication block; and,
    a controller, the controller, detects that a user has loaded a document into the fax machine, and attempts to use the wireless communication block to establish communication with a handheld device, and after establishing communication, receives from the handheld device a fax number for a fax destination; and a memory in which is stored a fax number database, wherein upon the fax machine receiving a command from the handheld device instructing the fax machine to update the fax number database, the fax machine updates the fax number database.

10. A fax machine as in claim 9 wherein the fax machine, upon receiving the fax number from the handheld device, sends a facsimile transmission to the fax destination.

11. A fax machine as in claim 9 wherein the handheld device is one of the following:
a cell phone;
a personal digital assistant.

12. A handheld device comprising:
a display;
a memory in which is stored a database that includes phone numbers; and, a wireless communication block, wherein the handheld device uses the wireless communication block to establish communication with a fax machine and in response to a user selecting a phone number from the database and a fax option, the wireless communication block sends a fax command and the phone number to the fax machine, and wherein the handheld device queries the user whether to update a fax number database residing on the fax machine with the phone number.

13. A handheld device as in claim 12 wherein when, in response to the query, the user requests update of a fax number database residing on the fax machine, the handheld device sends a command to the fax machine instructing the fax machine to update the fax number database residing on the fax machine with the phone number for the fax destination from the database residing on the handheld device.

14. A handheld device as in claim 12 wherein when, in response to the query, the user requests update of a fax number database residing on the fax machine, the handheld device sends a command to the fax machine instructing the fax machine to update the fax number database residing on the fax machine with the phone number for the fax destination and with additional information associated with the phone number.

15. A handheld device as in claim 12 wherein the handheld device is one of the following:
a cell phone;
a personal digital assistant.

16. Computer readable media that stores computer readable data which when executed by a processor within a fax machine, directs the fax machine to perform a method comprising the following:
upon detecting that a user has loaded a document into the fax machine performing the following:
attempting to use a wireless communication to establish communication with a handheld device,
upon establishing communication, sending a command to the handheld device, the command, requesting the handheld device to prompt the user for a fax number; and
updating a fax number data base within the fax machine upon the fax machine receiving a command from the handheld device instructing the fax machine to update the fax number database.

17. Computer readable media as in claim 16, wherein the method additionally comprises the following:

sending a facsimile transmission to the fax destination upon the fax machine receiving a fax number from the handheld device.

18. Computer readable media that stores computer readable data which when executed by a processor within a handheld device, directs the handheld device to perform a method comprising the following:
using wireless communication to establish communication with a fax machine;
sending a fax command and a phone number to the fax machine in response to a user selecting a fax option and a phone number from a database stored by the handheld device; and
querying the user whether to update a fax number database residing on the fax machine with the phone number.

19. Computer readable media as in claim 18, wherein the method additional comprises:
sending a command to the fax machine instructing the fax machine to update a fax number database residing on the fax machine with the phone number for the fax destination from the database residing on the handheld device when the user requests the update.

20. Computer readable media as in claim 18 wherein the handheld device is one of the following:
a cell phone;
a personal digital assistant.

21. A method performed by a fax machine, the method comprising the following:
upon detecting that a user has loaded a document into the fax machine performing the following:
attempting to use a wireless communication to establish communication with a handheld device,
upon establishing communication, sending a command to the handheld device, the command, requesting the handheld device to prompt the user for a fax number; and
updating a fax number data base within the fax machine upon the fax machine receiving a command from the handheld device instructing the fax machine to update the fax number database.

22. A method as in claim 21 additionally comprising the following:
sending a facsimile transmission to the fax destination upon the fax machine receiving a fax number from the handheld device.

23. A method performed by a handheld device, the method comprising the following:
using wireless communication to establish communication with a fax machine;
sending a fax command and a phone number to the fax machine in response to a user selecting a fax option and the phone number from a database stored by the handheld device; and
querying the user whether to update a fax number database residing on the fax machine with the phone number.

24. A method as in claim 23 additionally comprising the following:
sending a command to the fax machine instructing the fax machine to update a fax number database residing on the fax machine with the phone number for the fax destination upon the user request requesting the update.

25. A method as in claim 23 wherein the handheld device is one of the following:
a cell phone;
a personal digital assistant.

26. A fax machine comprising:

means for receiving documents;

means for transmitting and receiving wireless communications;

means for, upon detecting that a user has loaded a document into the fax machine, attempting to use the means for transmitting and receiving wireless communications to establish communication with a handheld device, and upon establishing communication, sending a command to the handheld device, requesting the handheld device to prompt the user for a fax number; and means for storing a fax number database, wherein upon the fax machine receiving a command from the handheld device instructing the fax machine to update the fax number database, the fax machine updates the fax number database.

27. A handheld device comprising:

means for displaying information;

means for storing a database that includes phone numbers; and, means for transmitting and receiving wireless communications, wherein the handheld device uses the means for transmitting and receiving wireless communications to establish communication with a fax machine and in response to a user selecting a phone number from the database and a fax option, the means for transmitting and receiving wireless communications sends a fax command and the phone number to the fax machine; and means for sending, in response to a user request, a command to the fax machine instructing the fax machine to update the fax number database residing on the fax machine with the phone number for the fax destination from the database residing on the handheld device.

28. A handheld device as in claim 27 wherein the handheld device is one of the following:

a cell phone;

a personal digital assistant.

* * * * *

UNITED STATES PATENT AND TRADEMARK OFFICE
CERTIFICATE OF CORRECTION

PATENT NO. : 7,382,501 B2
APPLICATION NO. : 10/613407
DATED : June 3, 2008
INVENTOR(S) : Curtis Reese et al.

It is certified that error appears in the above-identified patent and that said Letters Patent is hereby corrected as shown below:

In column 5, line 31, in Claim 13, delete "when,in" and insert -- when, in --, therefor.

In column 6, line 18, in Claim 19, delete "additional" and insert -- additionally --, therefor.

Signed and Sealed this

Twenty-sixth Day of May, 2009

JOHN DOLL
*Acting Director of the United States Patent and Trademark Office*